July 7, 1953
W. W. CUSHMAN
2,644,553
PANEL FASTENING MEANS
Filed June 5, 1947
3 Sheets-Sheet 2
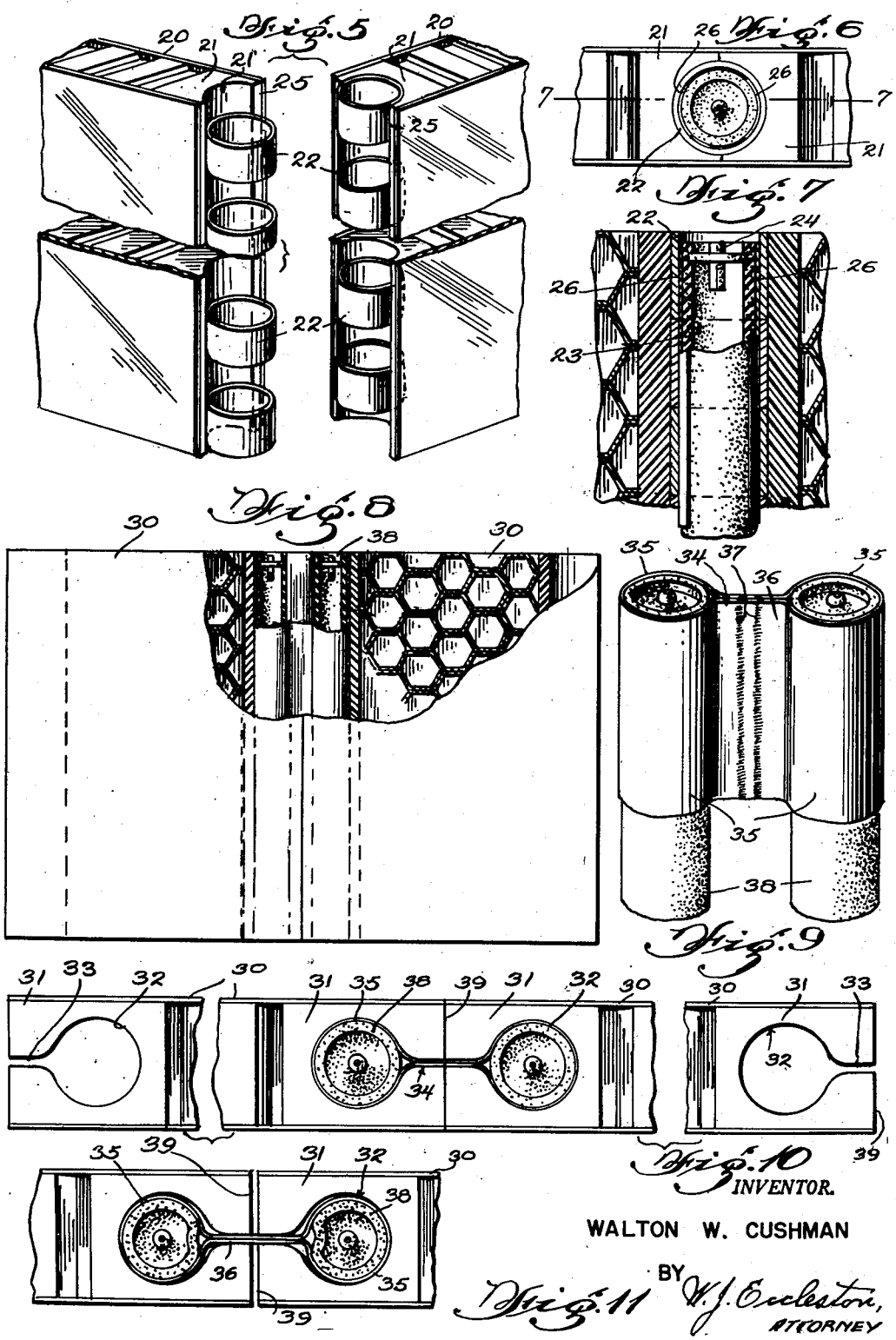
INVENTOR.
WALTON W. CUSHMAN
BY W. J. Eccleston,
ATTORNEY

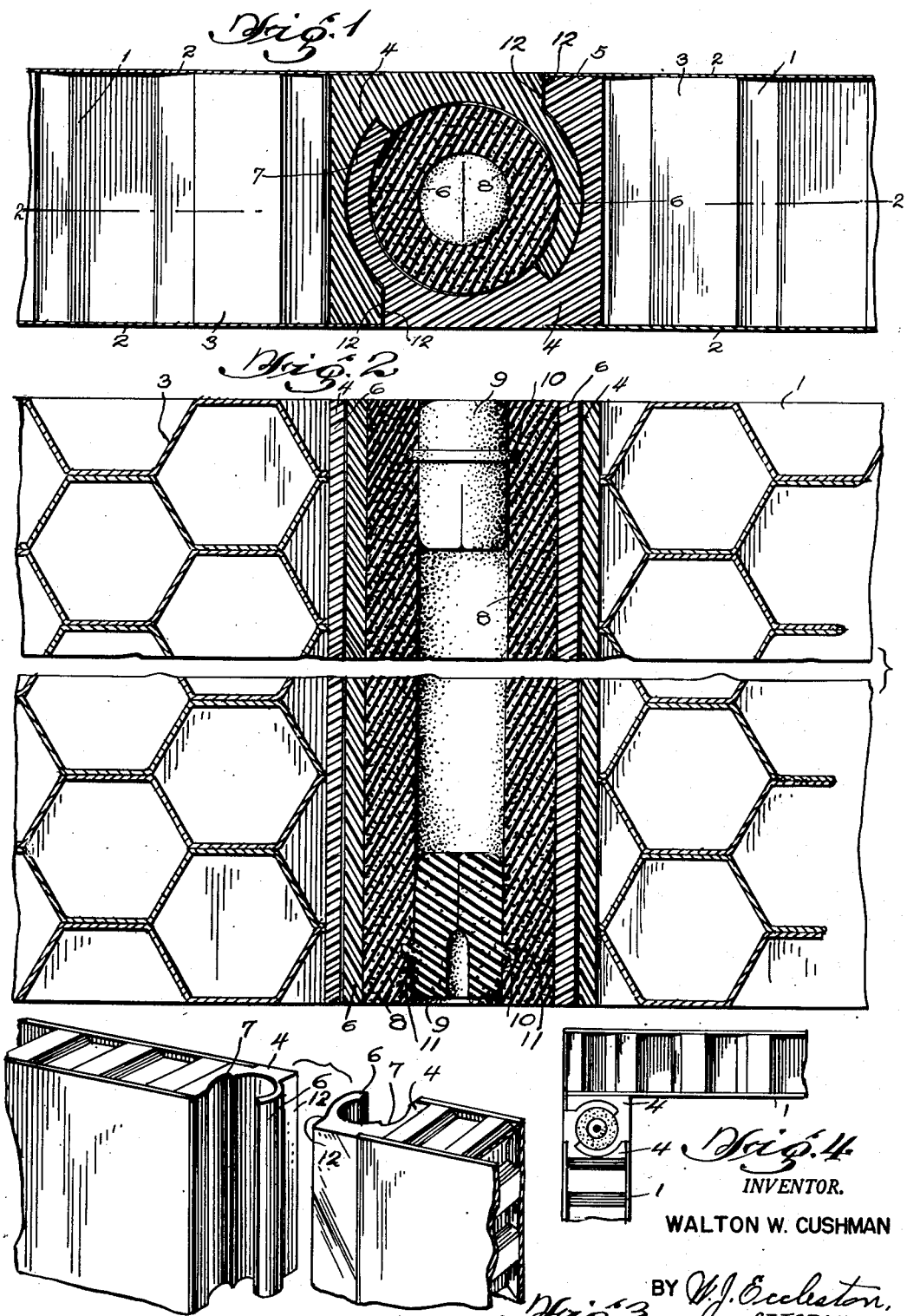

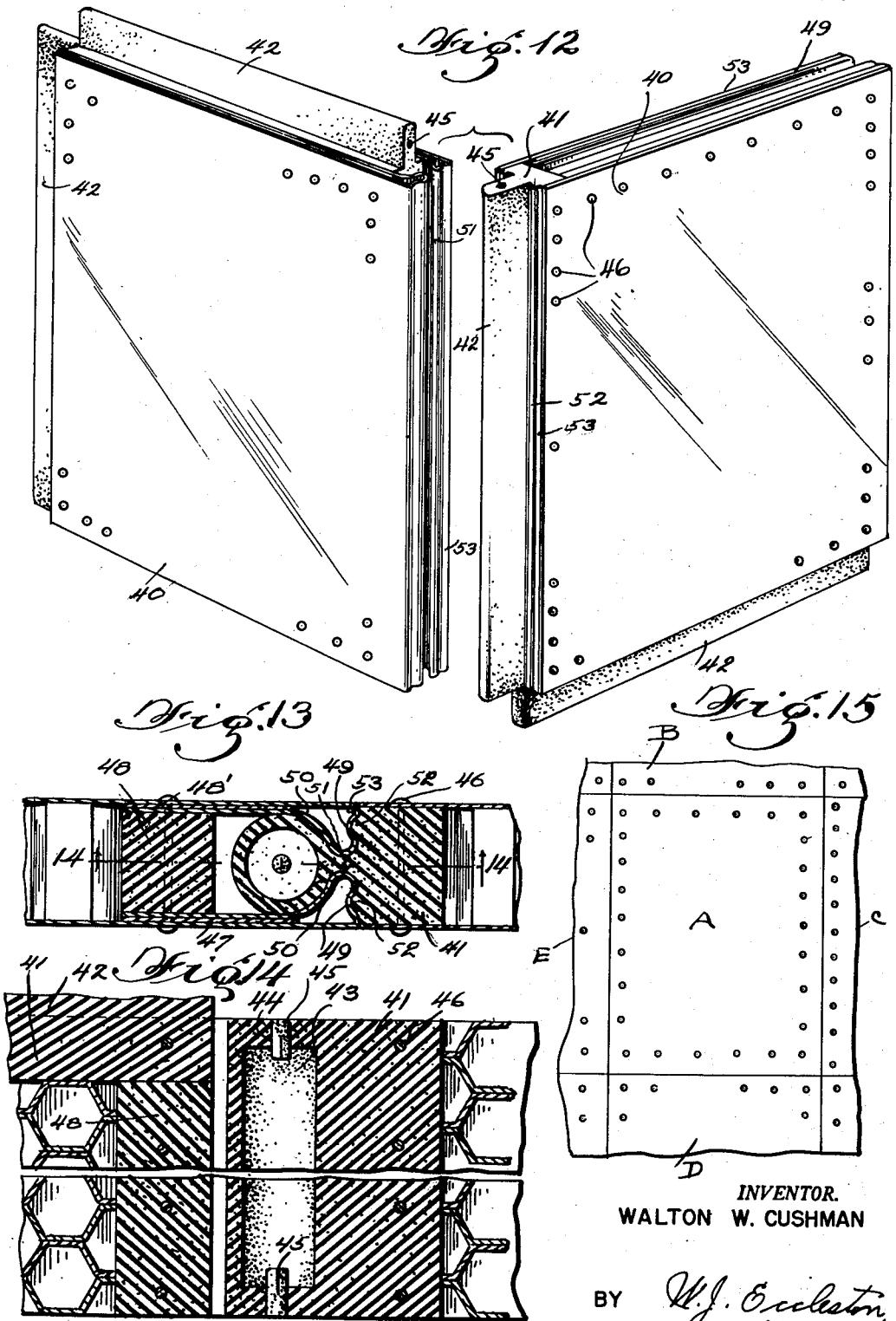

Patented July 7, 1953

2,644,553

UNITED STATES PATENT OFFICE 2,644,553

PANEL FASTENING MEANS

Walton W. Cushman, Webb City, Mo.

Application June 5, 1947, Serial No. 752,792

2 Claims. (Cl. 189—36)

(Granted under Title 35, U. S. Code (1952), sec. 266)

The invention described herein, if patented, may be manufactured and used by or for the Government for governmental purposes without the payment to me of any royalty thereon.

This invention relates to means for uniting the adjoining edges of portable and knockdown panels and while intended primarily for military use, such as in the assembling of shelters, it will be readily apparent that the invention may be incorporated in other types of buildings, refrigerator casings, etc.

A primary object of the invention is to provide a joint for a lightweight panel so that the load is spread or distributed throughout the edge of the panel whereby avoiding excessive strain at any particular point.

A further object of the invention resides in devising a joint for panels which will require only a minimum use of tools in uniting the panel edges.

It is also an object of the invention to provide a joint which will require no finger dexterity in its installation thus rendering it highly useful in extremely cold climates.

Another object of the invention consists in the formation of a joint which is of lightweight and at the same time moistureproof and air tight.

A still further object of the invention consists in the provision of a joint for building panels and the like which will require no frame and which will serve to automatically align the panels when the joint is tightened.

Other objects and advantages of the invention will be apparent from the following description when taken in connection with the accompanying drawings, in which:

Figure 1 is a horizontal sectional view through one form of the novel joint.

Figure 2 is a vertical sectional view taken on the line 2—2 of Figure 1.

Figure 3 is a fragmentary perspective view showing two of the portable panels about to be connected.

Figure 4 is a fragmentary plan view of a slightly modified form of the construction shown in Figures 1, 2 and 3.

Figure 5 is a fragmentary perspective view of a modified form of joint showing two panels just before being united.

Figure 6 is a plan view of the joint of Figure 5.

Figure 7 is a fragmentary sectional view taken on line 7—7 of Figure 6.

Figure 8 is an elevational view partly broken away showing a further modified type of joint.

Figure 9 is a fragmentary perspective view of the joining means per se.

Figure 10 is a plan view of the joint of Figure 9.

Figure 11 is a horizontal sectional view through the joint of Figures 8, 9 and 10 but showing the tubes as deflated and the panels as slightly spaced apart.

Figure 12 is a perspective view of two portable panels showing a further modified joint construction.

Figure 13 is a sectional view of the joint of Figure 12.

Figure 14 is a vertical sectional view, partly broken away, taken on line 14—14 of Figure 13; and Figure 15 is a more or less diagrammatic elevational view showing a central panel and its relationship to four other panels united to its four edges.

Referring to the drawings more specifically and particularly to Figures 1 to 3, inclusive, the numeral 1 indicates a portable and knockdown panel formed in the present instance of spaced walls 2 of sheet aluminum and an interposed filler or spacer element 3 comprised of honeycomb material such as woven fabrics impregnated with any suitable type of resin.

Attached to each of the adjoining edges of the two panels which are to be united is a piece of extruded aluminum 4 which is securely fixed in cut-back pockets 5 formed by cutting away portions of the filler 3. Each of the aluminum pieces 4 is composed of an arcuate hook-shaped member or shoulder 6 and a depression 7 having substantially the same curvature as the hook portion 6, and adapted to form a seat for the exterior wall of the hook portion on the adjoining element 4.

The joint of Figures 1, 2 and 3, as well as the other various joints disclosed in this application, are formed by inflating a rubber tube and in the form of the invention now being described, a rubber tube 8 is employed. This tube extends throughout the length of the joint and is interposed between the shoulders or hook portions 6 after the latter are arranged in overlapping relationship as indicated in Figure 1. The tube 8 may be inflated by means of a well-known valve construction 9 as shown in Figure 2. In this particular arrangement the valve which is formed of rubber and is provided with a longitudinal passage extending therethrough, is also formed with a flange 10, and this flange may be seated in an annular recess 11 and suitably glued therein to provide a permanent connection.

With the hook portions 7 arranged in overlapping relationship, the tube 8 is inflated and tends to force the hook members 6 farther and farther apart until their exterior walls seat in the complementary groove 7 of the opposed member. Each of the extruded metal pieces 4 is provided with squared shoulder portions 12 on their abutting faces, which shoulders cause the panels to be brought into accurate alignment, and aid in forming the water-tight and air-tight joint made by the tight seating of the hook members 6 in the respective depressions 7.

In Figure 4 the panels 1 are united at right angles of each other so as to form the corner of a shelter or other type of housing structure or receptacle. In this arrangement one of the extruded metal members 4 is united to a side of one of the panels at one edge thereof while the other member 4 is united as formerly to the edge of the other panel thereby providing the right-angle construction indicated. This joint, in all other respects, is identical with that shown and described in connection with Figures 1 to 3, inclusive.

In the modified construction shown in Figures 5 to 7, inclusive, an inflatable tube is also used for forming the joint. However, in this construction the panels 20 which are substantially identical with the panels heretofore described are provided at their adjoining edges with plastic strips 21 formed with a substantially semi-circular groove 21' extending throughout the length of the strip. Rings 22 are arranged and fixed in staggered relationship in the opposed grooves 21' and when these panels are brought together as shown in Figures 6 and 7, the ring members of the two adjoining edges are brought into substantial alignment and the inflatable tube 23 is threaded through the rings of the joint. The tube may be inflated by means of a valve member 24 which may be identical with the valve member 9 shown in Figures 1 to 4, inclusive. In this construction the grooved blocks 21 are provided with squared shoulders 25 whereby the panels are brought into accurate alignment when the squared shoulders of the opposing panels are brought into abutting relationship by the inflation of the tube 23. In order to avoid undue wear on the tube 23 in this particular construction, it may be found desirable to protect the tube from abrasive action by the various ring members 22 and for this purpose strips 26 of metal may be extended down the sides of the tube between it and the inner walls of the ring 22.

In this construction, as well as in that previously described, the panels are drawn into tight relationship by the inflation of the tube 23 and proper alignment of the panels is provided as just mentioned above, by the abutting relationship of the squared shoulders 25 on the edge members 21.

In the modified construction shown in Figures 8 to 11, inclusive, the adjoining edges of the panels 30 are each provided with a block of lastic material 31, each extending throughout the length of the panel and provided with a cylindrical opening 32 extending from end to end thereof and having a channel 33 extending to the outer edge of the block and throughout the length of the latter. In Figure 9 is shown a metallic member 34 of relatively thin flexible material provided with two cylindrical portions 35 and a connecting web portion 36 welded along its medium line as indicated by the numeral 37. The cylindrical sleeves 35 are somewhat smaller than the tubular openings 32 in the blocks 31, and are adapted to be mounted therein with the web portion 34 seated in the communicating channels 33 of the two blocks. Seated within each of the metallic tubular members 35 is an inflatable tube 38 corresponding to the tubes mentioned in connection with the previously described forms of joints and provided with valves which are also similar to those heretofore described. When these tubes are inflated in the usual manner, they cause the metallic sleeves or tubes 35 to be expanded and engage the walls of the openings 32 adjacent the channels 33 thereby drawing the panels tightly together; and as in the forms previously described, the abutting edges of the plastic blocks are provided with squared shoulders 39 which are drawn into abutting relationship to thereby accurately align the two panels when the joint is finally formed, as indicated at Figure 10.

In the modified construction shown in Figures 12 to 14, inclusive, one of the panel members 40 is provided at one or more of its edges with a block 41 of extruded rubber having an outwardly extending inflatable element in the form of a rib or web 42 which is positioned inwardly of the sides thereof to provide a pair of ledges and which extends throughout the length of the panel and is formed with a longitudinal slot 43. When the block 41 is extruded, the slot 43 extends throughout the length of the web 42 but thereafter the ends of the slot may be closed in any suitable manner as indicated at 44, and valves 45 are anchored therein. This block 41 may be secured in position by means of any suitable securing means 46 extending through the aluminum sheets of the panel and into the block 41.

The cooperating edge of the other panel which is to be joined to the first-mentioned panel is formed by bending inwardly the edges of the aluminum sheets and securing them together with reinforcing plates 47 and block 48, by any suitable securing means such as indicated by numeral 48'. The inwardly turned edges of the aluminum sheets are provided with a concave portion 49 at each side of the center line of the panel and are then curved outwardly toward the inner face of the metal sheets so as to form a socket having shoulder portions 50 and leave a necked-in opening 51 through which the web 42 of the opposed panel may enter into the space beyond the shoulders 50. When this member 42, which is the full equivalent of the inflatable tubes heretofore referred to, is inflated the engagement of the inflatable member with the shoulders 50 causes the panels to be drawn tightly together, and the block 41 is formed with ribs 52 in the ledges at each side of the element 42 which enter the concaved portions 49 of the opposed panel so as to interlock therewith and prevent lateral movement of one panel with respect to the other. This arrangement of concaved recesses 49 and the cooperating ribs 52 and the squared portions adjacent thereto, as indicated by numeral 53, provide a tight seal and cause the panels to be brought into accurate alignment when the joint is finally completed.

In Figure 15 is shown a central panel with a separate panel united to each of its four edges, the central panel being indicated by the reference character A and the four panels united thereto being indicated by the reference characters B, C, D and E. In this connection, it is to be noted that in Figure 12 the inflatable webs 42 are shown as secured to two of the edges and the other two edges are provided with the inturned metallic shoulders 50 and channel 51 adapted to receive the inflatable web 42 from panels which are to be joined thereto. This arrangement whereby the various edges of the panels are designed so that all four edges may be connected to provide a composite structure is inherent in all forms shown although it has been indicated only in Figures 12 to 15, inclusive.

In all forms of the invention the inflatable tube is common and serves to draw the panels tightly together. Also, each of the several joints disclosed herein is provided with squared shoulder portions adjacent the inflatable member so that the panels are automatically aligned when the tubes are inflated to make the final water-tight and air-tight locking joint.

From the foregoing disclosures taken in connection with the accompanying drawings, it will be seen that I have devised an exceedingly simple and lightweight joint for portable and knock-down panels; that it is water-tight and air-tight; that the load or strain on the joint is distributed throughout the edges of the panels so as to avoid excessive strain at any particular point; that the use of tools is reduced to a minimum or entirely eliminated, and that no basic framework whatever is necessary at the point where the joints are formed.

In accordance with the patent statutes, I have described what I now consider to be the preferred forms of the invention but various minor changes may obviously be made in the structural details without in any way departing from the spirit of the invention, and it is intended that all such changes be included within the scope of the appended claims.

I claim:

1. A panel joint comprising a pair of panels, each panel composed of spaced sheet metal plates and an interposed spacer element extending over the inner surfaces of the plates except for a marginal portion at the edges of the panel providing elongated recesses at said edges, a block of rubber disposed in one of the recesses of one panel and extending throughout the length thereof, an elongated inflatable element integral with said block and positioned inwardly of the sides thereof providing elongated ledges, said element extending beyond the panel edge, the marginal portions of the plates at the adjacent edge of the other panel being turned back inwardly upon themselves and providing a pair of shoulders forming a necked-in socket of substantially greater cross-sectional area and of greater depth than the width of the inflatable element, said element being located within the socket, whereby when the element is inflated it will draw the panels into abutting relationship with the outer faces of the shoulders in engagement with said ledges.

2. A panel joint comprising a pair of panels, each panel composed of spaced sheet metal plates and an interposed spacer element extending over the inner surfaces of the plates except for a marginal portion at the edges of the panel providing elongated recesses at said edges, a block of rubber disposed in a recess of one panel and extending throughout the length thereof, an elongated inflatable element integral with said block and positioned inwardly of the sides thereof providing elongated ledges, said element extending beyond the panel edge, the marginal portions of the plates at the adjacent edge of the other panel being turned back inwardly upon themselves and providing a pair of shoulders forming a necked-in socket of substantially greater cross-sectional area and of greater depth than the width of the inflatable element, complementary ribs and grooves formed in said ledges and the outer walls of said shoulders, said element being located within the socket, whereby when the element is inflated it will draw the panels into abutting relationship with said ribs seated in the grooves.

WALTON W. CUSHMAN.

References Cited in the file of this patent

UNITED STATES PATENTS

| Number | Name | Date |
| --- | --- | --- |
| 941,013 | Doble et al. | Nov. 23, 1909 |
| 1,389,362 | Jones | Aug. 30, 1921 |
| 1,672,905 | Riddell | June 12, 1928 |
| 2,008,741 | Allan | July 23, 1935 |
| 2,205,730 | Morgan | June 25, 1940 |
| 2,210,652 | Dennett | Aug. 6, 1940 |
| 2,256,791 | Schroeder | Sept. 23, 1941 |
| 2,257,001 | Davis | Sept. 23, 1941 |
| 2,360,276 | Redmond | Oct. 10, 1944 |
| 2,460,853 | Siple | Feb. 8, 1949 |

FOREIGN PATENTS

| Number | Country | Date |
| --- | --- | --- |
| 14,957 | Great Britain | of 1894 |
| 116,275 | Australia | of 1942 |